(12) United States Patent
Balmer et al.

(10) Patent No.: US 6,278,543 B1
(45) Date of Patent: Aug. 21, 2001

(54) DEVICE FOR QUANTUM OPTICAL AMPLIFICATION

(75) Inventors: Juerg Balmer, Biel; Thomas Graf, Bern; Jean-Michel Mayor, Yverdon-les-Bains, all of (CH)

(73) Assignee: Contraves Space AG, Zurich (CH)

( * ) Notice: Subject to any disclaimer, the term of this patent is extended or adjusted under 35 U.S.C. 154(b) by 0 days.

(21) Appl. No.: 09/213,091

(22) Filed: Dec. 15, 1998

(30) Foreign Application Priority Data

Mar. 3, 1998 (CH) .................................................. 0498/98

(51) Int. Cl.[7] ............................. H01S 3/081; G02B 27/28
(52) U.S. Cl. ........................... 359/347; 359/160; 359/346
(58) Field of Search ................................. 359/134, 160, 359/343, 345–7; 372/41, 70–72, 93, 100, 106

(56) References Cited

U.S. PATENT DOCUMENTS

| 3,668,536 | * | 6/1972 | Michon .................................. 372/93 |
| 4,276,519 | * | 6/1981 | Marteau ................................ 372/106 |
| 4,918,395 | * | 4/1990 | Difonzo et al. ....................... 359/343 |
| 4,993,813 | * | 2/1991 | Hiiro ..................................... 372/27 |
| 5,048,030 | * | 9/1991 | Hiiro ..................................... 372/68 |
| 5,050,175 | * | 9/1991 | Ayral et al. ............................. 372/21 |
| 5,249,196 | * | 9/1993 | Scheps ................................... 372/93 |
| 5,268,787 | * | 12/1993 | McIntyre ............................... 359/347 |
| 5,872,804 | * | 2/1999 | Kan et al. ............................... 372/93 |
| 5,974,074 | | 10/1999 | Mayor et al. . |

FOREIGN PATENT DOCUMENTS

| 35298197 | * | 12/1997 | (JP) . |
| 97/066587 | * | 2/1997 | (WO) . |

OTHER PUBLICATIONS

Graf et al., Variable–Configuration Resonator (VCR) with Three Diode–Laser End–Pumped Nd: YAG Rods OSA Tops vol. 10 pp. 370–375, 1997.
Graf et al., Multi–Nd: YAG–rod variable–configuration resonator (VCR) end pumped by multiple diode–laser bars Optics Communications, vol. 135, pp. 171–178, 1997.
Bikmatov et al, Polarization effects in active Fresnel rhomb zig–zag slab amplifier, SPIE, vol. 3047, pp.171–177, 10/96.
Cannell et al., A simple double–pass spherical Fabry–Perot Interferometer Rev. Sci. Instrum., vol. 44, No. 11, pp. 1651–1653, 11/73.
Bikmatov et al, Oct. 25, 1966, Proc. of the SPIE, vol. 3047, pp171–177, Abstract Only Herewith.*
Graf et al, Optical Communications, vol. 135, No. 1–3, pp 171–178, Feb. 1, 1997, Abstract Only Herewith.*
Cannell et al, Review of scientific instruments, vol. 44, No. 11, pp 1651–1653, 11/1973, Abstract Only Herewith.*
Graff et al, OSA Trends in Optics & Photonics Series, vol. 10, pp 370–375, Jan. 29, 1997, Abstract Only Herewith.*

* cited by examiner

Primary Examiner—Nelson Moskowitz
(74) Attorney, Agent, or Firm—Townsend and Townsend and Crew, LLP; Guy W. Chambers, Esq.

(57) ABSTRACT

The invention relates to devices for the quantum-optical amplification of modulated light, in particular in optical free-space communications systems. In the process a light beam (4) is conducted through a plurality of adjoining crystals (66), (68), (70), which are delimited from each other by means of polarization-selectively reflecting layers (104), (106). The light beam (4) is repeatedly reflected at the edge areas of the crystals into quarter-wave plates (86), (88), (90), (92), (94), and in the process its polarization is respectively rotated by 90 degrees.

20 Claims, 6 Drawing Sheets

DEVICE FOR QUANTUM OPTICAL AMPLIFICATION

FIELD OF THE INVENTION

The invention relates to devices for the quantum-optical amplification of modulated light, in particular in optical free-space communications systems.

BACKGROUND OF THE INVENTION

In the near future, the optical free-space communication between satellites, as well as between satellites and ground stations, will constitute an important supplement to the existing microwave technology, which also saves weight on board the satellite. So-called optical terminals consist of one or several telescopes, which limit the angular range of the field of view of an optical receiver in the direction toward a counter-station, and also provide a directional radiation of the signals to be transmitted. Several movable mirrors are furthermore provided, by means of which the alignment of the transmitting and receiving directions is performed. Besides the direct detection of the optical output of the transmitter of the counter-station constituting the transmission process, the coherent superimposition of the received light with the light of the same frequency of a local oscillator laser plays an important role since, besides great sensitivity to the signal to be detected, the insensitivity to interference by background radiation is important.

The diode lasers, which have reached a high degree of development because of their extensive application in fiber-optical communications, also represent an alternative, at least for simple systems operating with intensity modulation, and in addition also save space and weight. But in spite of their operation on only a single optical frequency, which has also been achieved here, they are generally not yet suitable for coherent transmission processes, except for complicated structures with large, additionally coupled-in resonators. One reason is the still too large spectral width of this radiated optical frequency. Although fiber-optical coherent transmission systems do operate with customary commercial diode lasers, because of the line guided transmission, detection takes place with a relatively large optical output.

But the background radiation, which is interferingly present in free-space transmissions, as well as the mostly very low power of the received signals, require an optical bandwidth of the unmodulated signal which is considerably narrower than the modulation bandwidth. This is a requirement which, together with small size and low weight, can be best met by diode laser-pumped solid-state lasers. Existing attempts to integrate the laser systems required for operation into a terminal for optical free-space communications have been described by Carlson et al., as well as by Marshalek et al. (R. T. Carlson et al., "Monolithic Glass Block Lasercom Terminal: Hardware Proof of Concept and Test Results", SPIE, vol. 2381, Free-Space Laser Communications Technologies VII, Feb. 7–8, 1995, San Jose, Calif., pp. 90 to 102; R. G. Marshalek et al., "Lightweight, High Data-Rate Laser Communications Terminal or Low Earth Orbit Satellite Constellations", SPIE vol. 2381, Free-Space Laser Communications Technologies VII, Feb. 7–8, 1995, San Jose, Calif., pp. 72–82).

Both groups of authors describe laser systems which are mechanically coupled to the optical devices of a terminal and which guide their light emissions into the optical device by means of collimated beams. However, diode lasers in accordance with the state of the art have been used here.

Diode laser-pumped solid-state lasers have a larger volume and lower efficiency and therefore generate a larger amount of waste heat than comparable diode lasers. The increased amount of heat produced in the vicinity of the optical system has been shown to be a risk for the undisturbed operation of the optical device.

The insufficient modulation capability of diode laser-pumped solid-state lasers represents a further problem. In contrast to diode lasers, the medium generating the optical amplification remains in an excited state for a relatively long time after the supply of pump energy. Furthermore, the resonator of such lasers is considerably larger than that of diode lasers. As a result, cut-off frequencies of approximately 100 kHz are typical for amplitude modulation, for example. The external modulation required for this is also quite difficult to perform, since a high optical power must be manipulated, which requires the use of electro-optical modulators which have low cut-off frequencies.

External modulation of laser light can be performed at high cut-off frequencies in modulators in which the light is conducted in a waveguide, which permits a small mutual distance between the electrodes that provide the modulating voltage, and therefore permits a lower modulation voltage. Since, because of the strong increase of the optical intensity caused by the narrow cross section of the optical waveguide, this method only permits low optical output, the modulated optical signal must be post-amplified. Attempts to do this consist in the application of processes and devices which, in the meantime, have proven themselves in fiber-guided optical communications, for example by means of the post-amplification of the modulated optical signal with a fiber amplifier doped with erbium (T. Araki, M. Yajima. S. Nakamori, Y. Hisada, "Laser Transmitter Systems for High Data-Rate Optical Inter-Orbit Communications", SPIE vol. 2381, Free-Space Laser Communications Technologies VII, Feb. 7–8, 1995, San Jose, Calif., pp. 264–272).

Besides diode laser-pumped solid-state lasers, appropriate traveling wave amplifiers are also used, wherewith, especially for the post-amplification of light, devices operating with lasers from the same technology are available, in particular for diode laser-pumped neodymium-YAG solid-state lasers, which are very useful for optical free-space communications because of their narrow spectral width. The light to be amplified is conducted into an amplifying crystal, in which the photons of the light beam, with a defined probability, meet atoms which are in an optically excited state, which is comparatively stable over time because of the special properties of the material. The relative stability of this state is interrupted by a photon having the same energy as the difference between the excited state and the lower laser level of the atom, wherewith the respective atom releases an additional photon with the same wavelength (i.e. the same energy) and phase.

The excited state of the atoms is caused by so-called pump light, which generally has a shorter wavelength than the light to be amplified and puts the atoms in an excited state corresponding to the energy of its photons, from which the latter spontaneously change into a relatively stable state, whose energy difference with the non-excited lower laser level corresponds to the energy of the photons of the light to be amplified. A high amplification of the light is achieved if, during the passage through the amplifying medium, the photons of the light to be amplified meet many excited atoms. The volume density of excited atoms therefore must be very high. However, since a certain portion of the excited atoms per unit of time spontaneously transits into the lower laser level because of a finite average lifetime of the excited state, and the photon emitted in the process is lost for the amplification of the light, it is necessary to continuously pump light with a high intensity into the medium, even when there is a lack of light to be amplified, in order to maintain the high volume density of excited atoms. At low input intensity such devices provide high amplification factors but, their efficiency is extremely low. On the other hand low amplification factors are observed when the light to be amplified already has a high intensity, i.e. if a large average rate of photons passes through the amplifying medium and the density of excited atoms is reduced because of a high rate of stimulated emissions of additional photons.

After a short average time each atom excited by the pump light transits into the lower laser level induced by a photon of the light to be amplified. With a comparatively long average lifetime of the excited atoms, there is a comparatively low probability of a spontaneous, and therefore useless, transit to the lower laser level, because of which the efficiency at high intensity and therefore low amplification is high.

In order to achieve a high amplification, along with a simultaneously high rate of stimulated transits into the lower laser level, it is necessary, despite the low density of excited atoms in the amplifying medium, to assure a large average number of additional photons generated by stimulated transits of excited atoms into the lower laser level. This is mostly achieved in that the light to be amplified is guided over as many paths as possible through the zone of an amplifying medium irradiated with pump light. With a respectively constant volume density of excited atoms, for each photon of the light to be amplified the probability to generate additional, stimulatedly emitted photons is multiplied by the number of paths through the gain medium.

It is therefore possible to generate a comparatively high amplification factor in spite of low pump power. However, the devices in accordance with the state of the art are constructed of several elements requiring a lot of space and mass, which therefore only poorly satisfy space travel-specific requirements. Special developments also contain the risk of insufficient mechanical stabilities (T. J. Kane, E. A. P. Cheng, B. Nguyen, "Diode-Pumped ND:YAG Amplifier with 52 dB Gain", SPIE vol. 2381, Free-Space Laser Communications Technologies VII, Feb. 7–8, 1995, San Jose, Calif., pp. 273–284; T. E. Olson, T. J. Kane, W. M. Grossmann, H. Plaessmann, "Multiple Diode-Pumped ND:YAG Optical Amplifiers at 1.96 µm and 1.32 µm", Optical Letters, vol. 6, No. 5, May 1994, pp. 605–608).

An additional problem for space travel applications consists in that the diode lasers used for generating the pump light also have a limited lifetime. Accordingly it is necessary to keep several diode lasers in reserve for every diode laser-pumped solid-state laser and each diode laser-pumped optical amplifier in order to be able to replace broken-down ones.

But diode lasers provided in redundancy require optical devices which permit switching between the light beams emitted by the individual laser diodes.

OBJECT AND SUMMARY OF THE INVENTION

It is therefore the object of the invention described below to avoid the disadvantages of the prior art and to amplify light quantum-optically with high amplification and efficiency, employing multi-path solid-state amplifiers.

Usually, after passing an optical insulator, light from a diode-laser pumped solid-state laser operating at low optical power is coupled into a waveguide modulator in order to have its phase modulated with a broad-band information signal. Thereafter, the optical post-amplification of the modulated signal takes place, which is performed either in a diode laser-pumped amplifier or a doped optical fiber. The base element of a diode laser-pumped amplifier in accordance with the invention consists of a laser medium of appropriate geometry (hereinafter called a crystal), whose volume is irradiated with pump light by diode lasers along respectively two beams. The light to be amplified is coupled into the crystal in such a way that, before it leaves the crystal amplified, because of reflection at several reflecting layers it moves several times through the crystal along zones irradiated by pump light. The reflecting layers are either directly applied to lateral faces of the crystal or are located at sides facing away from the crystal on quarter-wave plates respectively arranged in the immediate vicinity of a face of the crystal.

A further development of this concept includes an amplifying medium consisting of two crystals separated by a polarization-selective layer, wherein the light to be amplified passes the zones of a crystal irradiated with pump light eight times, and those of the other crystal twice. In the process two quarter- wave plates with a mirror integrated on the side facing away from the crystal, as well as a mirror, are used.

Both amplifiers are supplied with pump light by diode lasers. The pump light can be conducted from several redundantly supplied diode lasers into a multimode optical fiber, whose outlet then leads via a beam-generating optical device into the crystal of an amplifier.

In a continuation of the described further development, additional crystals with respectively two correspondingly designed quarter-wave plates, as well as respectively one additional polarization-selective layer, are inserted between the crystals of the quantum-optical amplifier in accordance with the described further development, wherein pump light is supplied through the quarter-wave plates and their mirrors acting in a wavelength- selecting manner. Here, the number of the optically pumped zones through which the light to be amplified passes is respectively increased by 2.

This device has the advantage of assuring a high amplification because of a high number of passages of the light to be amplified through optically pumped zones. In addition the structure of the quantum-optical amplifier has a special mechanical ruggedness, while its mass and spatial extension are comparatively small. A further advantage in connection with four-level systems for quantum-optical amplification is the fact that the loss or reduction of optical pump power in one of the optically pumped zones does not cause any absorption by the medium of the light to be amplified. It is therefore possible to keep redundantly embodied pump light sources available at different locations of a crystal for generating an optically pumped zone, because of which the use of special, mechanically actuated optical switching devices for detecting different pump light sources for a single optically pumped zone can be omitted.

Further details, characteristics and advantages of the invention ensue not only from the claims and the characteristics to be taken from them, by themselves and/or in combination, but also from the following description of a preferred embodiment.

DETAILED DESCRIPTION OF THE PREFERRED EMBODIMENT

Figure 1:
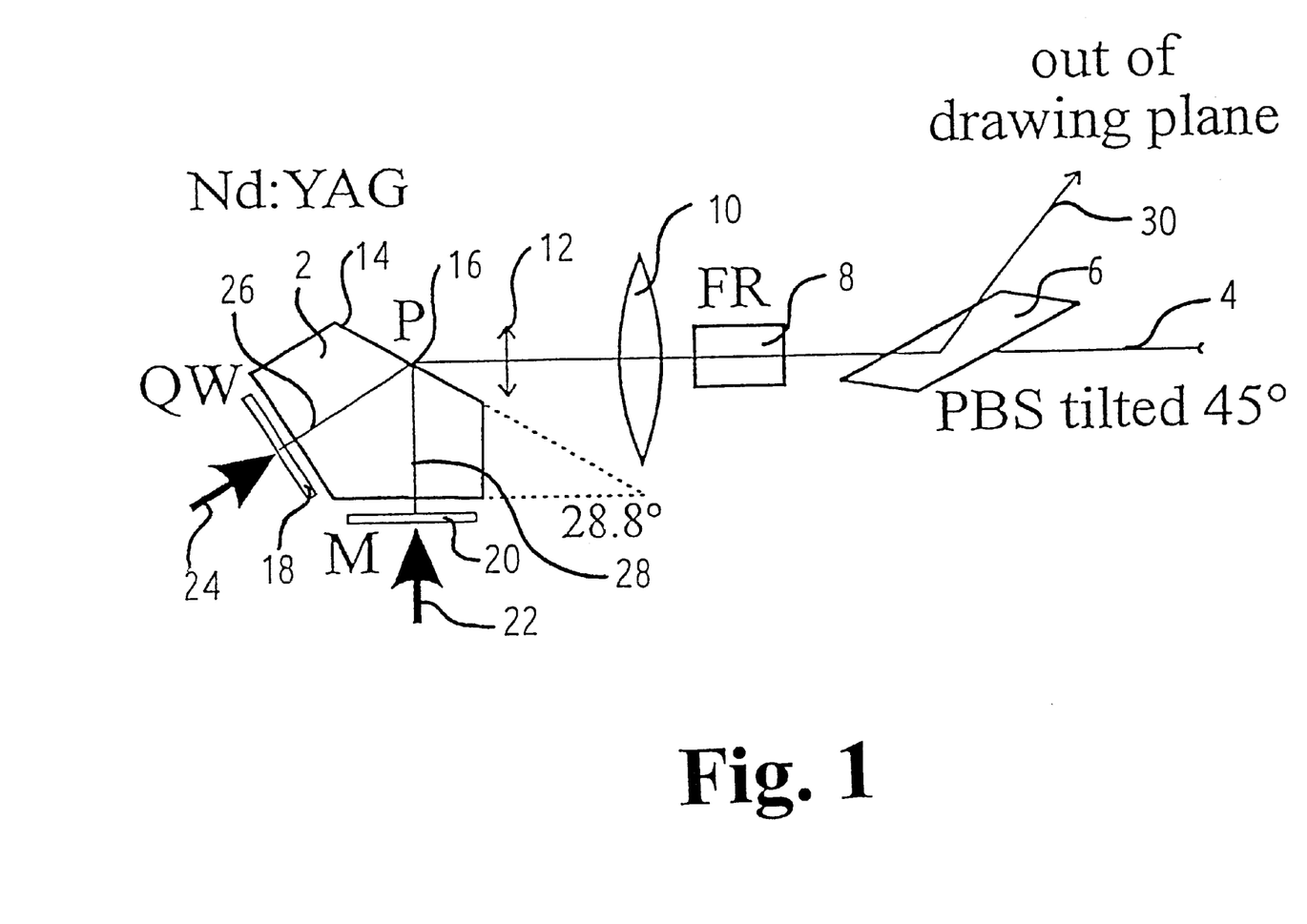
FIG. 1 represents a quantum-optical amplifier consisting of a single crystal.

FIG. 1 shows a quantum-optical amplifier embodied in the form of a single crystal 2. A light beam 4 passes through a polarizing beam splitter 6. After the subsequent passage through a Faraday rotator 8, the polarization of the light beam 4 is rotated by 45 degrees. Indicated by a symbol 12, the light beam 4, in a polarization parallel to the drawing plane, is guided through a lens 10, to a point 16 of a polarization-selective layer 14 of the crystal 2. In order to meet this condition for the layer 14 of the crystal 2 as well as for the polarizing beam splitter 6, the polarizing beam splitter 6 should be imagined to be turned by 45 degrees in respect to the drawing plane. After passing the point 16, the light beam 4 coupled into the crystal 2 propagates through the optically denser crystal 2 as the medium along a line 26 in the direction of a quarter-wave plate 18, which is directly attached to the appropriate surfaces of the crystal 2. The side of the quarter-wave plate 18 facing away from the crystal has been coated in such a way that light of the wavelength of the light beam 4 is reflected in the opposite direction as completely as possible, while a pump light beam 24 can pass through the quarter-wave plate 18 with the smallest possible losses. The pump light beam 24 generates an optical amplification of the light beam 4 by means of the optical excitation of a zone of the crystal 2 which overlaps as well as possible that of the light beam 4.

Because of the double passage through the quarter-wave plate, the direction of polarization of the light beam 4 moving back in the crystal 2 is now orthogonal in respect to the direction of the polarization of the light beam 4 refracted into the crystal 2 at the point 16 of the surface 14 in the direction of the quarter-wave plate 18. The light beam 4 is now propagated along the line 26 in the crystal 2 in the direction of the surface 14 acting reflectively in a polarization-selective manner in order to be reflected in the direction of a mirror 20 at the point 16. The mirror 20 reflects the greatest possible portion of the light beam 4 being propagated toward it along a line 28 in the opposite direction. The greatest possible portion of a further pump light beam 22 is guided into the crystal 2 through the mirror 20, which is embodied to be wave-selective, in order to optically pump the crystal 2 along the line 28. As an alternative, the mirror 20 can be coated directly on to the crystal face. Following its reflection at the mirror 20, the light beam 4, whose polarization is unchanged, is propagated along the line 28 in the direction of the point 16 in order to be reflected a second time on the surface 14 and to be propagated along the line 26 in the direction of the quarter-wave plate 18. The polarization direction of this light beam is now orthogonal to the light beam 4 refracted at the point 16 into the crystal. After again being reflected at the side of the quarter-wave plate 18 facing away from the crystal 2 and passage through it, the light beam 4 is again propagated in the direction of the point 16, wherein its polarization is parallel to that of the light beam 4 entering the crystal at the beginning. For this reason, its reflection-free refraction in the direction of the lens 10 takes place at the point 16, its passage through the Faraday rotator 8, as well as the reflection of the light beam 4, now polarized orthogonally with the incoming light beam, at the polarizing beam splitter 6 in the direction of a line 30. The light beam 4 altogether passes six times through optically pumped zones of the crystal 2. The light beam 4 passes four times through the respective optically pumped zone along the line 26, wherein every propagation direction and respectively both polarizations, which are orthogonal in respect to each other, are used. Light radiation passes through the respective optically pumped zone along the line 28 in both oppositely directed propagation directions with the same linear polarization.

Figure 2:
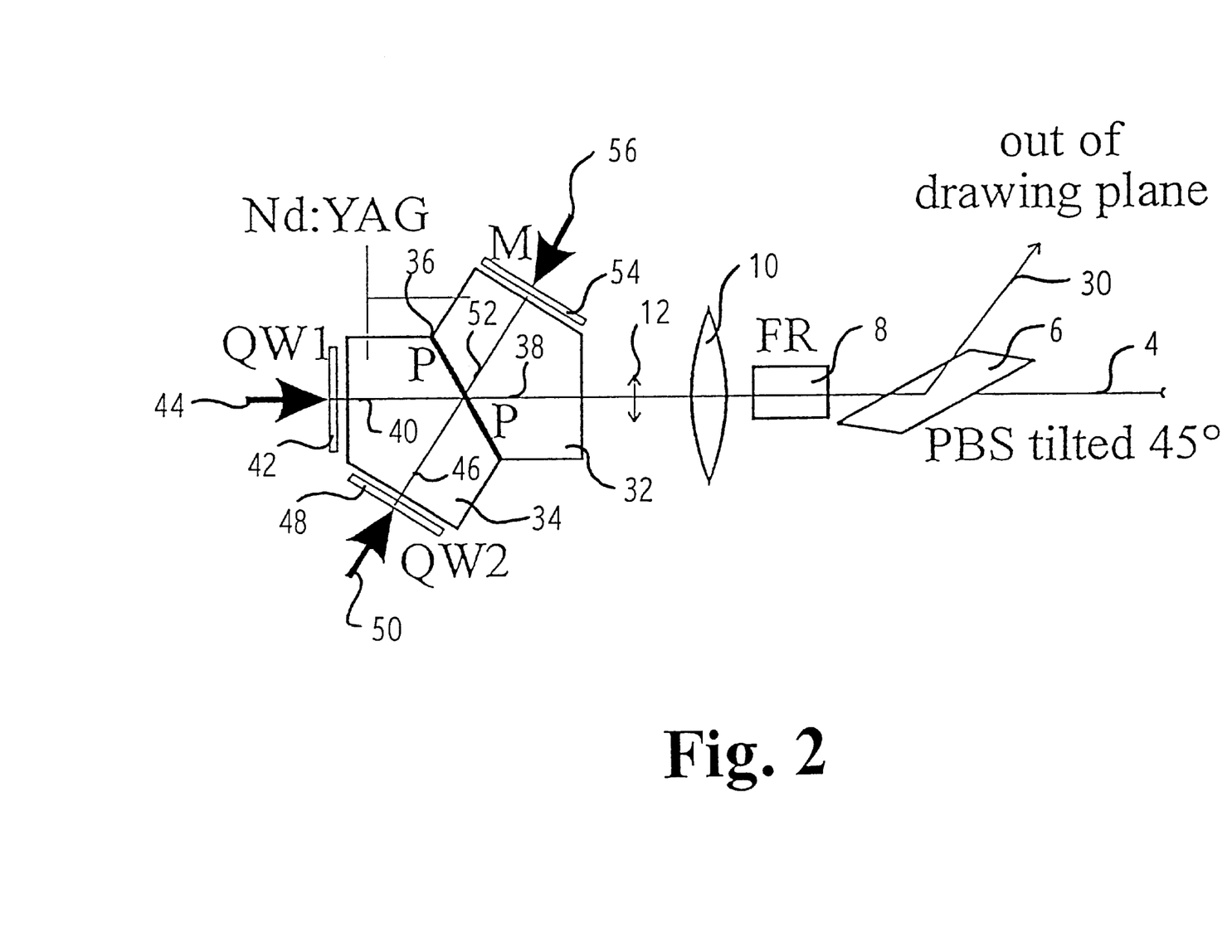
FIG. 2 represents a quantum-optical amplifier consisting of two crystals.

The light beam 4 passes through a greater number of optically pumped zones in a device in accordance with FIG. 2. As in the device of FIG. 1, the light beam 4 first passes through the polarizing beam splitter 6, the Faraday rotator 8 and the lens 10 in order to be beamed with the polarization represented by the symbol 12 into a first crystal 32. After propagation along a line 38, the light beam 4 reaches through a polarization-selectively reflecting layer 36 a further crystal 34 and is propagated therein along a line 40 in the direction of a quarter-wave plate 42, which corresponds in its design to the quarter-wave plate 18 in FIG. 1. The embodiment of a pump light source 44 also corresponds to that of the pump light source 24 in FIG. 1. After the reflection at the quarter-wave plate 42 of the light beam 4, which has been propagated along the lines 38 and 40 in the direction of the quarter-wave plate 42, the light beam 4, its polarization rotated by 90 degrees, is propagated in the opposite direction along the line 40 in order to be reflected at the polarization-selectively reflecting layer 36 in the direction of a further quarter-wave plate 48, whose embodiment corresponds to that of the quarter-wave plate 18 in FIG. 1. A pump light source 50 also corresponds to all above described embodiments of pump light sources. Following the reflection at the quarter-wave plate 48, the light beam 4 is propagated, its polarization again rotated by 90 degree, along the line 46 from the quarter-wave plate 48 to the polarization-selectively reflecting layer 36, in order to pass through it into the crystal 32 and to be propagated along the line 52 in the direction of a mirror 54. In its embodiment, the mirror 54 corresponds to the mirror 20 in FIG. 1, a pump light source 56 also corresponds to previous embodiments. Following reflection at the mirror 54, the light beam passes in the opposite direction again through the crystals 32 and 34 without being reflected at the layer 36. Following a further reflection at the quarter-wave plate 48, the light beam 4 is propagated in the crystal 34 along the lines 46 and 40 in the direction toward the quarter-wave plate 42 wherein, because of the rotation of the polarization of the light beam 4 by 90 degrees during the reflection at the quarter-wave plate 48, it is reflected at the layer 36. A now following reflection of the light beam 4 at the quarter-wave plate 42 has the result that the light beam 4, its polarization again rotated by 90 degrees, passes through the crystals 34 and 32 along the lines 40 and 38 without being reflected at the layer 36. The separation of the light beam 4 leaving the crystal 32 takes place in the manner explained by means of FIG. 1. In this embodiment, the light beam 4 passes a total of ten times through optically pumped zones. Respectively fourfold passages in both possible directions and polarizations take place along the line 40 as well as the line 46 inside the crystal 34. A double passage in both possible directions and in the polarization represented by the symbol 12 takes place along the line 52 in the crystal 32.

Figure 3:
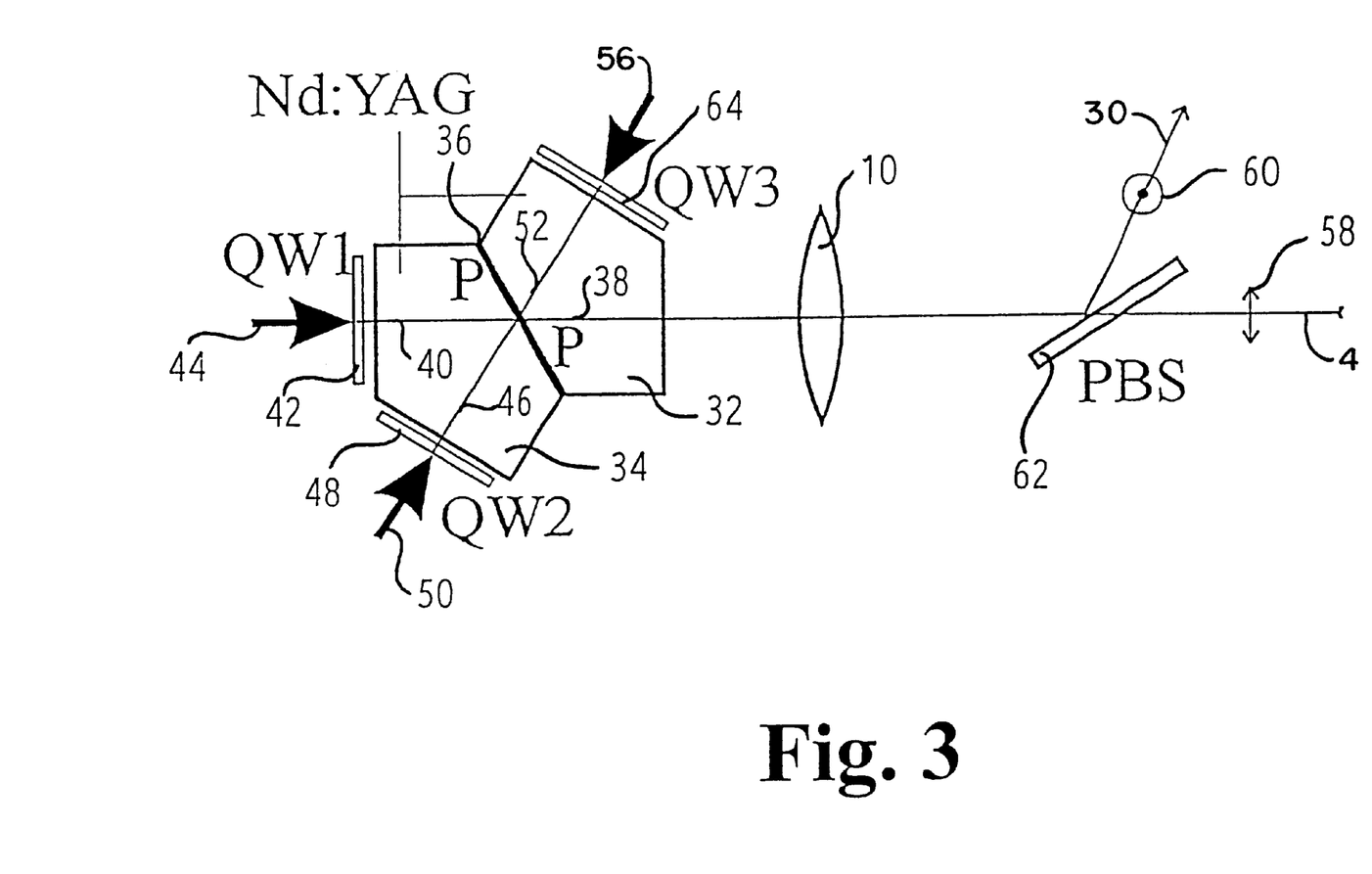
FIG. 3 represents a quantum-optical amplifier consisting of two crystals without a Faraday rotator.

The replacement of the mirror 54 in the embodiment of FIG. 2 results in a further embodiment in accordance with FIG. 3, in which an optical insulator is not required for the separation of light beams 4 passing into and out of the device, which leads to considerable savings in mass and volume.

In the embodiment represented in FIG. 3, the light beam 4 radiates through a polarizing beam splitter 62 in the polarization represented by the symbol 58, the lens 10 and the crystals 32 and 34 along the lines 38 and 40, without being reflected at the polarization-selectively reflecting layer 36. Thereafter reflection at the quarter-wave plate 42 takes place, because of which the light beam is propagated with a polarization rotated by 90 degrees in the opposite direction along the line 40 in order to be reflected in the direction toward the quarter-wave plate 48 at the polarization-selectively reflecting layer 36. It is reflected at the quarter-wave plate 48 after propagation along the line 46 and is propagated with a polarization rotated by 90 degrees in the opposite direction along the line 46. Without reflection at the layer 36, the light beam 4 enters the crystal 32 in order to be propagated along the line 52 in the direction toward a quarter-wave plate 64, which corresponds in its embodiment to the quarter-wave plates 42 and 48. Following reflection at the quarter-wave plate 62, the light beam 4 is propagated with a polarization rotated by 90 degrees in the opposite direction along the line 52, in order to be reflected at the polarization-selectively reflecting layer 36 in the direction of the line 38, on which it leaves the crystal 32 in order to be reflected, after passing the lens 10, in the direction of the line 30 by means of the polarizing beam splitter 62. The light beam 4 leaving the crystal 32 has a polarization represented by the symbol 60. In this embodiment the light beam 4 passes six times through optically pumped zones in the two crystals 32 and 34, the optically pumped zones located upstream of the quarter-wave plates 42, 48 and 64 along the lines 40, 46 and 52 are respectively passed in both possible directions in polarizations respectively orthogonal in respect to each other.

Figure 4:
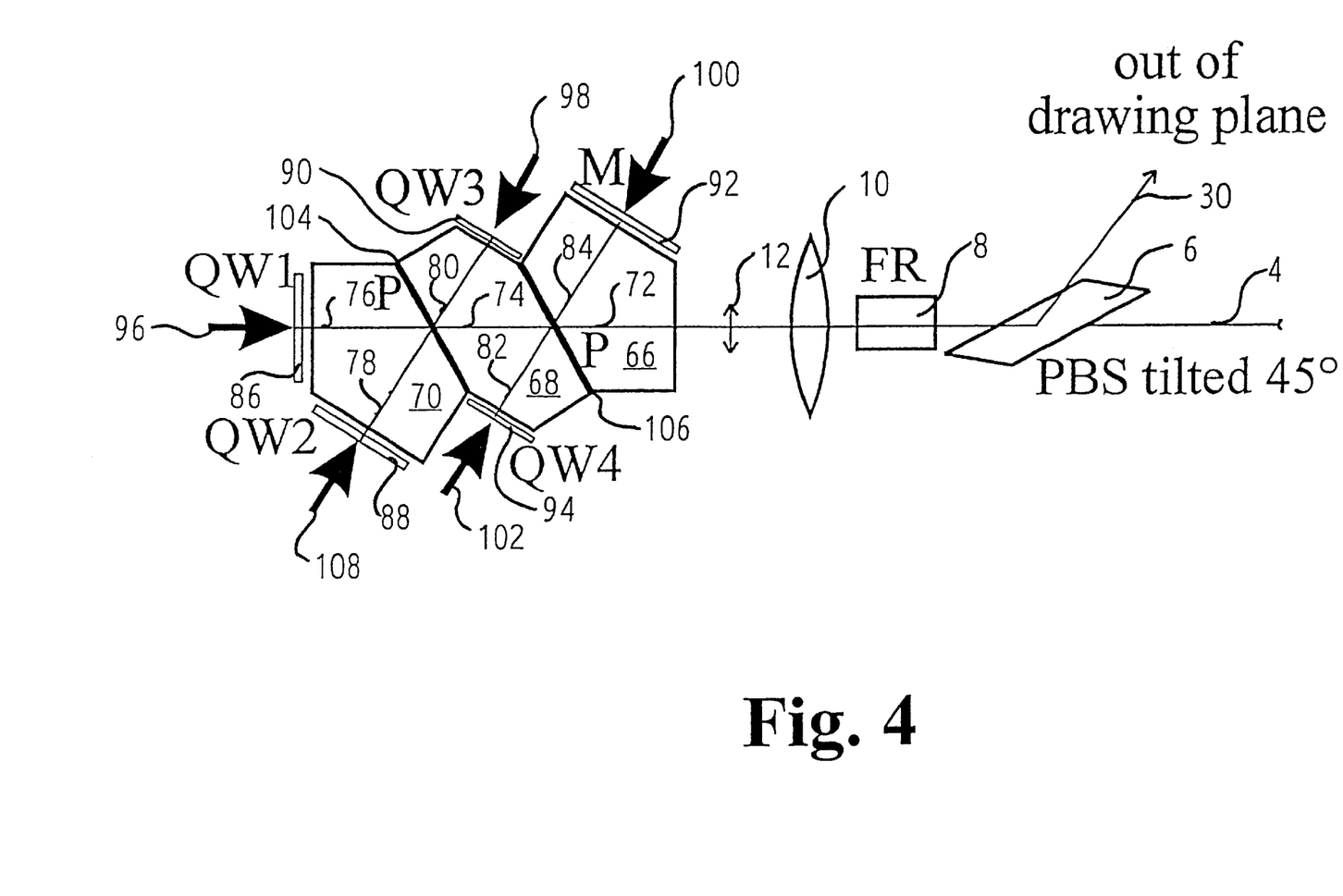
FIG. 4 represents a quantum-optical amplifier consisting of three crystals.

A further increase of the number of passages of the light beam 4 through optically pumped zones can be achieved by means of a device in accordance with FIG. 4. After passing through the polarizing beam splitter 6, the Faraday rotator 8 and the lens 10, the light beam 4, in a polarization represented by the symbol 12, passes first along a line 72, a line 74 and a line 76 through a crystal 66, a crystal 68 as well as a crystal 70, without being reflected at a polarization-selectively reflecting layer 106 and a further polarization-selectively reflecting layer 104. Following reflection at a quarter-wave plate 86, the light beam 4 is propagated in a polarization rotated by 90 degrees in the opposite direction along the line 76, in order to be reflected at the polarization-selectively reflecting layer 104 in the direction of a line 78. Following reflection at a further quarter-wave plate 88, the light beam 4 is propagated in the opposite direction, again with its polarization rotated by 90 degrees, in the direction of the line 78 as well as a line 80, wherein a reflection-free transition from the crystal 70 to the crystal 68 takes place. Following reflection at a quarter-wave plate 90, the light beam 4 is propagated in the opposite direction and with a polarization rotated by 90 degrees, along the line 80 in order to be reflected at the polarization-selectively reflecting layer 104 into the propagation path defined by the line 74. Thereafter a further reflection at the polarization-selectively reflecting layer 106 in the direction of the line 82 takes place, after which the light beam 4 is reflected in the opposite direction at a further quarter-wave plate 94 and its polarization is again rotated by 90 degrees. Then the light beam 4 is propagated along a line 82 and a line 84 in the direction of a mirror 92, at which it is reflected in the opposite direction without a rotation of its polarization. When the light beam 4 thereafter has passed once more the polarization-selectively reflecting layer 106 without being reflected, another reflection takes place at the quarter-wave plate 94, because of which the light beam 4, its polarization rotated by 90 degrees, is propagated along the line 82 in the direction of the polarization-selectively reflecting layer 106, is now reflected at it and is propagated along the line 74 and, by another reflection at the polarization-selectively reflecting layer 104, along the line 80 in the direction of the quarter-wave plate 90. Because of its polarization being at the same time rotated by 90 degrees, the reflection of the light beam 4 at the quarter-wave plate 90 results in the reflection-free passage through the polarization-selectively reflecting layer 104 along the line 80 as well as the line 78. Following reflection at the quarter-wave plate 88, the light beam 4 is propagated along the line 78 in the direction of the polarization-selectively reflecting layer 104 in order to be reflected at it on the line 76 in the direction of the quarter-wave plate 86. The reflection at the quarter-wave plate 86 causes a rotation of the polarization of the light beam 4 by a further 90 degrees. Therefore the light beam 4 then passes the polarization-selectively reflecting layer 104 as well as the polarization-selectively reflecting layer 106 along the line 76, the line 74 as well as the line 72 without being reflected, in order to be separated, after passing through the lens 10, by means of the Faraday rotator 8 and the polarizing beam splitter 6. In this embodiment the light beam 4 passes through a total of 18 pumped zones. These are added together from respectively four passages through the optically pumped zones placed upstream of the four quarter-wave plates 86, 88, 90 and 94, and from two passages through the optically pumped zone placed upstream of the mirror 92.

FIG. 5 again represents an embodiment of the device, represented in its basic function in FIG. 4, which permits the omission of the high-mass and large-volume Faraday rotator 8.

In a polarization represented by the symbol 58, after passage through the polarizing beam splitter 62 and the lens 10, the light beam 4 first passes along the line 72, the line 74 and the line 76 through the crystal 66, the crystal 68 as well as the crystal 70, without being reflected at the polarization-selectively reflective layer 106 and the polarization-selectively reflective layer 104. Following reflection at the quarter-wave plate 86, the light beam 4 is propagated, with its polarization rotated by 90 degrees, in the opposite direction along the line 76 in order to be reflected at the polarization-selectively reflecting layer 104 in the direction of the line 78. After reflection at the quarter-wave plate 88, the light wave 4 is propagated in the opposite direction, again with its polarization rotated by 90 degrees, in the direction of the line 78 as well as the line 80, wherein a reflection-free transit from the crystal 70 to the crystal 68 takes place. Following reflection at the quarter-wave plate 90, the light beam 4 is propagated in the opposite direction, with its polarization rotated by 90 degrees, along the line 80 in order to be reflected into the propagation path defined by the line 74 at the polarization-selectively reflecting layer 104. Thereafter a further reflection at the polarization-selectively reflecting layer 106 in the direction of the line 82 takes place, after which the light beam 4 is reflected in the opposite direction at the quarter-wave plate 94 and its polarization is again rotated by 90 degrees. Then the light wave 4 is propagated along the line 82 and the line 84 in the direction of a further quarter-wave plate 110, where its polarization is rotated by 90 degrees and it is reflected in the opposite direction along the line 84 in order to now be reflected at the polarization-selectively reflecting layer 106 in the direction of the line 72. After leaving the crystal 66, the light beam 4 passes through the lens 10 and is reflected at the polarized beam splitter 62 in the direction of the line 30, since now the polarization of the light beam 4, represented by the symbol 60, extends orthogonally to the light beam 4 entering the crystal 66. In the device represented in FIG. 5, a total of ten passages of the light beam 4 through optically pumped zones of the crystals 66, 68 as well as 70 takes place. These are added up from the respectively double passage of the light beam 4 through respectively one optically pumped zone upstream of the quarter-wave plates 86, 88, 90, 94 as well as 110, each time in both directions and with polarizations orthogonally in respect to each other.

Figure 5:
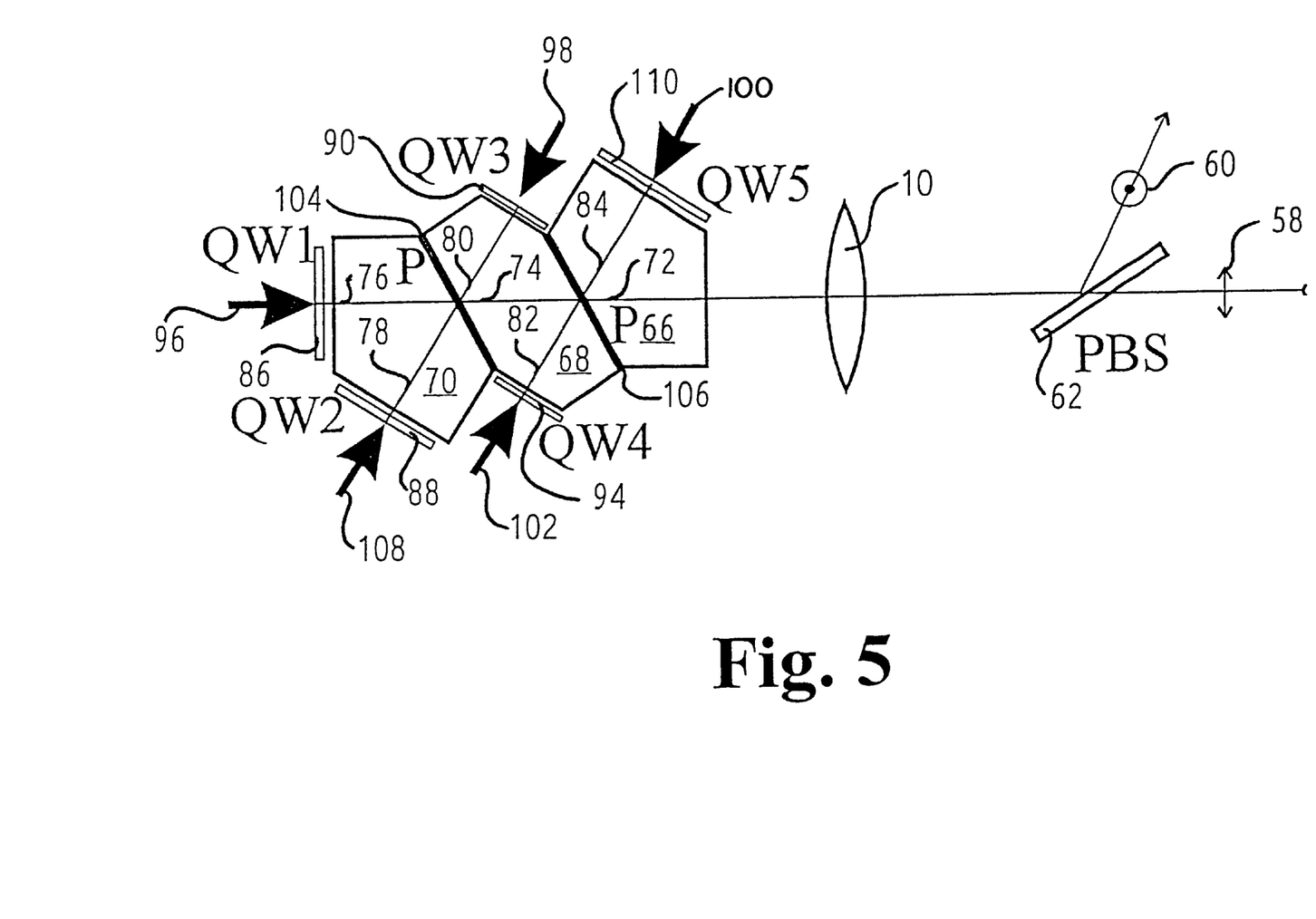
FIG. 5 represents a quantum-optical amplifier consisting of three crystals without a Faraday rotator.

The device represented in FIG. 4 and FIG. 5 can be configured into amplifiers with any arbitrary number of passages of the light beam 4 through optically pumped zones of the crystals of such a quantum-optical amplifier by the respective addition of a further crystal 68, a further polarization-selectively reflecting layer 104 and further quarter-wave plates 90 and 94 and pump light sources 96, 98, 100, 102, and 108.

If the crystals 2, 32, 34, 66, 68 as well as 70 mentioned in the above exemplary embodiments, whose material can be arbitrarily selected, are not made of optically isotropic, but optically uniaxial material, such as neodymium yttrium vanadate, for example, the optical axis of such crystals must be aligned perpendicularly in relation to the beams to be amplified. If the crystals have been cut in that way, it is possible in accordance with the principle of a Glan-Foucault prism, to achieve the polarization-selective reflection of beams to be amplified required in the arrangement of FIGS. 2 to 6 also be means of a simple, optically isotropic space. In addition, it is also possible to realize a Glan-Taylor prism by the different orientation of the optical axes of adjoining crystals.

Figure 6:
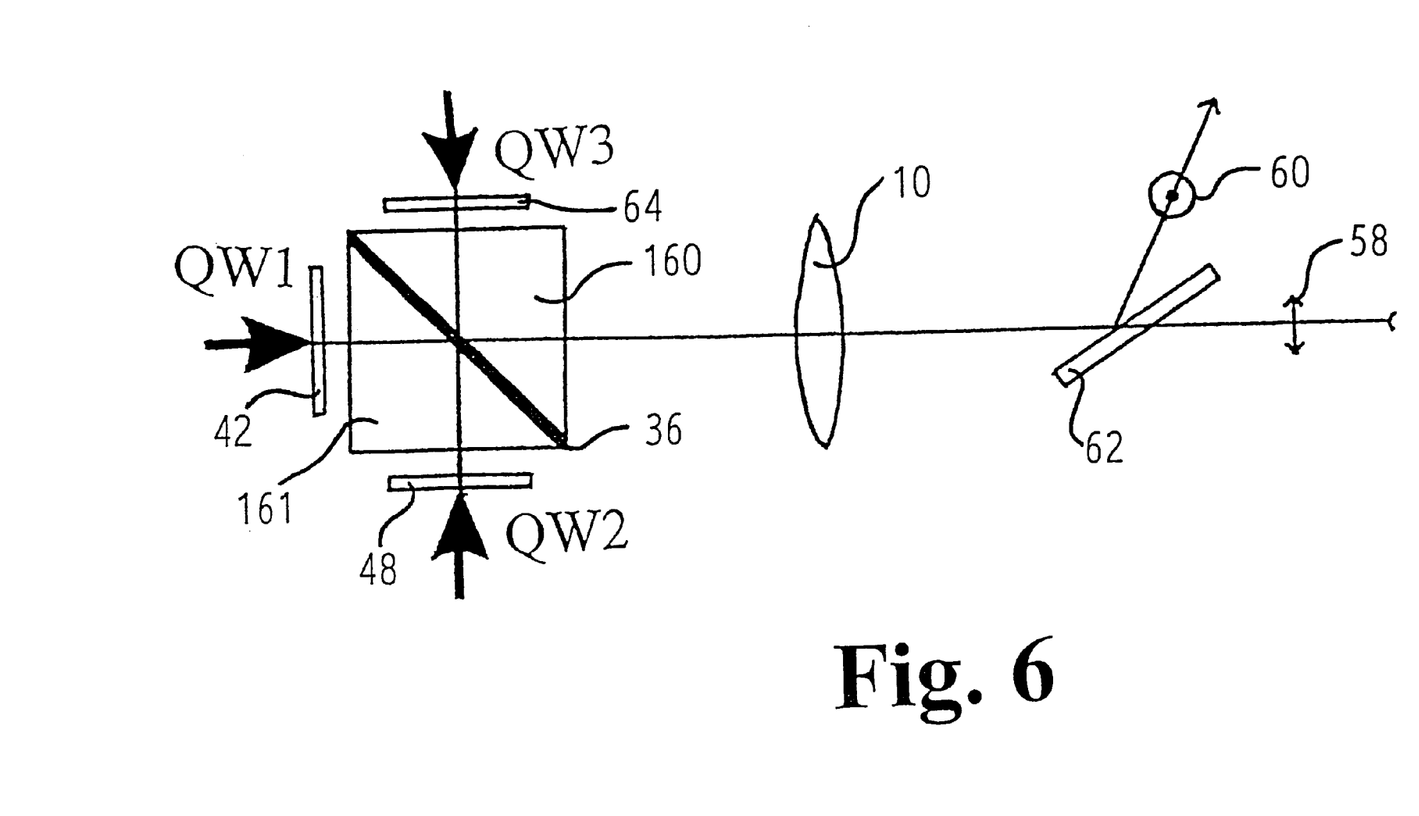
FIG. 6 represents a variant of a further quantum-optical amplifier consisting of two crystals.

The exterior shape of the crystals 32, 34, 66, 68 as well as 70 in FIGS. 2 to 5 is not limited to the shapes here represented. By way of example, FIG. 6 represents a variant of the amplifier of FIG. 3 in the form of a 45 degree polarizing beam splitter cube. It is again possible with this embodiment to design the polarization-selective layer 36 as an optically isotropic space in the manner of a Glan-Foucault prism or a Glan-Taylor prism, if optically uniaxial crystals are employed. The quarter-wave plate 64 can furthermore be replaced by a mirror in order to arrive at a structure analog to the one represented in FIG. 2. In addition, structures analogous to those in FIGS. 4 and 5 can be realized by stringing together cubes made of crystals 160 and 161.

What is claimed is:

1. A device for quantum-optical amplification of modulated light comprising:
   a first crystal having a front facing first face for receiving a main light beam, a second face for receiving a first pumped light beam and a third face;
   a second crystal having a first face for receiving a second pumped light beam, a second face for receiving a third pumped light beam and a third face connected to said third face of said first crystal;
   wherein said first and second crystals are so connected that the main light beam passes through both of them in a straight line.

2. The device in accordance with claim 1 further comprising a quarter wave plate adjacent to a crystal face which receives a light beam.

3. The device in accordance with claim 2 further comprising a polarization-selectivity reflection layer located between said connecting faces of said first and second crystals.

4. The device in accordance with claim 2 further comprising a mirror adjacent to a crystal face which receives a light beam.

5. The device in accordance with claim 2 further comprising a polarizing beam splitter and a lens interposed between the source of said main light beam and said front facing first face of said first crystal.

6. A device for quantum-optical amplification of modulated light comprising:
   a prism shaped first crystal having a front facing first face for receiving a main light beam, a second face for receiving a first pumped light beam and a third face; and,
   a prism shaped second crystal having a first face for receiving a second pumped light beam, a second face for receiving a third pumped light beam and a third face connected to said third face of said first crystal;
   wherein said first and second crystals are so connected that they form a cube through which said main light beam can pass in straight line.

7. The device in accordance with claim 6 further comprising a quarter wave plate adjacent to a crystal face which receives a light beam.

8. The device in accordance with claim 6 further comprising a polarization-selectivity reflection layer located between said connecting faces of said first and second crystals.

9. The device in accordance with claim 6 further comprising a polarizing beam splitter and a lens interposed between the source of said main light beam and said front facing first face of said first crystal.

10. A device for quantum-optical amplification of modulated light comprising:
    a first crystal having a front facing first face for receiving a main light beam, a second face for receiving a first pumped light beam and a third face;
    a second crystal having a first face for receiving a second pumped light beam, a second face for receiving a third pumped light beam, a third face connected to the third face of said first crystal and a fourth face;
    a third crystal having a first face for receiving a fourth pumped light beam, a second face connected to said fourth face of said second crystal and a rear facing third face;
    wherein said first, second and third crystals are so connected that said main light beam passes through all three crystals in a straight line.

11. The device in accordance with claim 10, further comprising a quarter wave plate adjacent to a crystal face which receives a light beam.

12. The device in accordance with claim 1, further comprising a first polarization-selectivity reflection layer located between said connecting faces of said first and second crystals and a second polarization-selectivity reflection layer located between said connecting faces of said second and third crystals.

13. The device in accordance with claim 12 further comprising a mirror adjacent to a crystal face which receives a light beam.

14. The device in accordance with claim 12 wherein the planes of said first and second faces of said second crystal are at least approximately parallel.

15. The device in accordance with claim 12 wherein the planes of at least two of the pumped light beam receiving faces are at least approximately parallel.

16. The device in accordance with claim 12 wherein said front facing first face of said first crystal and said rear facing third face of said third crystal are at least approximately parallel.

17. The device in accordance with claim 12 further comprising a polarizing beam splitter and a lens interposed between the source of said main light beam and said front facing first face of said first crystal.

18. The device in accordance with claim 17 further comprising a Faraday rotator interposed between said polarizing beam splitter and said lens.

19. The device in accordance with claim 12 wherein said crystals are optically uniaxial crystals which are cut in such a way that their optical axes extend perpendicular to or parallel with the field of all beams to be amplified.

20. The device in accordance with claim 12, wherein said polarization-selectivity reflection layers are interposed between optically uniaxial crystals.

* * * * *